US008577678B2

(12) United States Patent
Nakadai et al.

(10) Patent No.: US 8,577,678 B2
(45) Date of Patent: *Nov. 5, 2013

(54) SPEECH RECOGNITION SYSTEM AND SPEECH RECOGNIZING METHOD

(75) Inventors: Kazuhiro Nakadai, Wako (JP); Toru Takahashi, Kyoto (JP); Hiroshi Okuno, Kyoto (JP)

(73) Assignee: Honda Motor Co., Ltd., Tokyo (JP)

( * ) Notice: Subject to any disclaimer, the term of this patent is extended or adjusted under 35 U.S.C. 154(b) by 200 days.

This patent is subject to a terminal disclaimer.

(21) Appl. No.: 13/044,737

(22) Filed: Mar. 10, 2011

(65) Prior Publication Data

US 2011/0224980 A1    Sep. 15, 2011

Related U.S. Application Data

(60) Provisional application No. 61/312,740, filed on Mar. 11, 2010.

(51) Int. Cl.
| | | |
|---|---|---|
| G10L 15/06 | (2013.01) | |
| G10L 15/20 | (2006.01) | |
| G10L 19/14 | (2006.01) | |
| G10L 15/14 | (2006.01) | |
| G10L 15/28 | (2013.01) | |
| G10L 15/00 | (2013.01) | |

(52) U.S. Cl.
USPC ........... 704/233; 704/243; 704/234; 704/231; 704/256; 704/255; 704/236; 704/240

(58) Field of Classification Search
USPC ......... 704/243, 233, 234, 231, 256, 255, 236, 704/240
See application file for complete search history.

(56) References Cited

U.S. PATENT DOCUMENTS

| | | | | |
|---|---|---|---|---|
| 5,485,522 | A * | 1/1996 | Solve et al. | 381/56 |
| 5,712,953 | A * | 1/1998 | Langs | 704/214 |
| 5,781,883 | A * | 7/1998 | Wynn | 704/226 |
| 6,098,038 | A * | 8/2000 | Hermansky et al. | 704/226 |
| 6,230,123 | B1 * | 5/2001 | Mekuria et al. | 704/226 |
| 6,519,559 | B1 * | 2/2003 | Sirivara | 704/227 |
| 6,804,640 | B1 * | 10/2004 | Weintraub et al. | 704/226 |
| 7,072,831 | B1 * | 7/2006 | Etter | 704/226 |
| 7,596,231 | B2 * | 9/2009 | Samadani | 381/94.2 |
| 7,941,315 | B2 * | 5/2011 | Matsuo | 704/226 |
| 8,073,690 | B2 * | 12/2011 | Nakadai et al. | 704/233 |
| 8,249,271 | B2 * | 8/2012 | Bizjak | 381/94.1 |
| 8,489,396 | B2 * | 7/2013 | Hetherington et al. | 704/233 |

(Continued)

OTHER PUBLICATIONS

Zheng Fang, Wu Wenhu, Fan.g Ditang. Center-distance continuous probability models and the distance measure. J. of Computer Science and Technology, 1998, 13(5): 426-437.*

(Continued)

*Primary Examiner* — Edgar Guerra-Erazo
(74) *Attorney, Agent, or Firm* — Squire Sanders (US) LLP (57) ABSTRACT

A speech recognition system according to the present invention includes a sound source separating section which separates mixed speeches from multiple sound sources from one another; a mask generating section which generates a soft mask which can take continuous values between 0 and 1 for each frequency spectral component of a separated speech signal using distributions of speech signal and noise against separation reliability of the separated speech signal; and a speech recognizing section which recognizes speeches separated by the sound source separating section using soft masks generated by the mask generating section.

6 Claims, 11 Drawing Sheets

(56) References Cited

U.S. PATENT DOCUMENTS

| | | | |
|---|---|---|---|
| 2002/0150265 A1* | 10/2002 | Matsuzawa et al. | 381/94.2 |
| 2006/0136205 A1* | 6/2006 | Song | 704/243 |
| 2008/0059098 A1* | 3/2008 | Zhang | 702/103 |
| 2011/0051948 A1* | 3/2011 | Boldt et al. | 381/73.1 |
| 2011/0191101 A1* | 8/2011 | Uhle et al. | 704/205 |
| 2011/0224980 A1* | 9/2011 | Nakadai et al. | 704/233 |
| 2012/0245927 A1* | 9/2012 | Bondy | 704/203 |
| 2013/0142343 A1* | 6/2013 | Matsui et al. | 381/56 |

OTHER PUBLICATIONS

McCowan, I.A., Morris, A.C. & Bourlard, B. (2002) "Improving speech recognition performance of small microphone arrays using missing data techniques", Proc ICSLP'02.*

S. Yamamoto, K. Nakadai, H. Tsujino, T. Yokoyama and H. G. Okuno: "Improvement of robot audition by interfacing sound source separation and automatic speech recognition with missing feature theory", Proceedings of the 2004 International Conference on Robotics and Automation (ICRA2004), pp. 1517-1523, 2004.(ICRA2004), pp. 1517-1523, 2004.*

Yamamoto, S.; Nakadai, K.; Nakano, M.; Tsujino, H.; Valin, J.-M.; Komatani, K.; Ogata, T.; Okuno, H.G.;, "Design and implementation of a robot audition system for automatic speech recognition of simultaneous speech," Automatic Speech Recognition & Understanding, 2007. ASRU. IEEE Workshop on, vol., no., pp. 111-116, Dec. 9-13, 2007.*

Aarthi M. Reddy; Bhiksha Raj, Soft Mask Estimation for Single Channel Speaker Separation, 2004, ISCA Tutorial and Research Workshop on Statistical and Perceptual Audio Processing.*

Yang Shao;DeLiang Wang, Robust Speaker Recognition Using Binary Time-Frequency Masks, 2006, IEEE, vol. 1, p. 1-4.*

Sebastien Demange; Christophe Cerisara; Jean-Paul Haton, Missing data mask estimation with frequency and temporal dependencies, Jan. 2009, Computer Speech and Language archive, vol. 23 Issue 1, pp. 25-41.*

Toru Takahashi et al., "Missing-Feature-Theory-based Robust Simultaneous Speech Recognition System with Non-clean Speech Acoustic Model", The 2009 IEEE/RSJ International Conference on Intelligent Robots and Systems, Oct. 11-15, 2009, pp. 2730-2735.

Shun'ichi Yamamoto et al., "Design and Implementation of a Robot Audition System for Automatic Speech Recognition of Simultaneous Speech", IEEE, 2007, pp. 111-116.

Bhiksha Raj et al., "Missing-Feature Approaches in Speech Recognition", IEEE Signal Processing Magazine Sep. 2005, pp. 101-116.

Michael L. Seltzer et al., "A Bayesian Classifier for Spectrographic Mash Estimation for Missing Feature Speech Recognition", Science Direct, Speech Communication 43, 2004, pp. 379-393.

Philippe Renevey et al., "Missing Feature Theory and Probabilistic Estimation of Clean Speech Components for Robust Speech Recognition", Swiss Federal Institute of Technology, Lausanne, Switzerland, 4 pages, In Sixth European Conference on Speech Communication and Technology, EUROSPEECH 1999, Budapest, Hungary, Sep. 5-9, 1999. ISCA, 1999.

Jon Barker et al., "Soft Decisions in Missing Data Techniques for Robust Automatic Speech Recognition", Department of Computer Science, University of Sheffield, Sheffield, UK, 4 pages, 2000.

\* cited by examiner

SPEECH RECOGNITION SYSTEM AND SPEECH RECOGNIZING METHOD

BACKGROUND OF THE INVENTION

1. Field of the Invention

The present invention relates to a speech recognition system and a speech recognizing method for simultaneous recognition of speeches from multiple sources.

2. Background Art

The technology of simultaneous recognition of speeches from multiple sources is important for robots that work in the real environment. A speech recognition system for simultaneous recognition of speeches from multiple sources separates mixed speeches into speeches from respective sources and performs speech recognition using acoustic features of separated speeches. In speech recognition a mask prepared according to reliability of separation is used for each acoustic feature. As masks, soft masks which take continuous values between 0 and 1 have been proposed (US201010082340A1). However, in the conventional method, soft masks have been generated experimentally, and therefore an experiment has to be carried out for each of different environments to determine the structure of the soft mask. Thus, a speech recognition system and a speech recognizing method using soft masks having a structure which is able to cope with a change in environment have not been developed.

Accordingly, there is a need for speech recognition system and a speech recognizing method using soft masks having a structure which is able to cope with a change in environment.

SUMMARY OF THE INVENTION

A speech recognition system according to the first aspect of the present invention includes a sound source separating section which separates mixed speeches from multiple sound sources from one another; a mask generating section which generates a soft mask which can take continuous values between 0 and 1 for each frequency spectral component of a separated speech signal using distributions of speech signal and noise against separation reliability of the separated speech signal; and a speech recognizing section which recognizes speeches separated by the sound source separating section using soft masks generated by the mask generating section.

According to the present aspect, the mask generating section generates soft masks using distributions of speech signal and noise against separation reliability of the separated speech signal, and therefore appropriate soft masks can be generated according to changes in environment. As a result, a high-performance speech recognition system can be obtained.

A speech recognizing method according to the second aspect of the present invention includes the steps of separating, by a sound source separating section, mixed speeches from multiple sound sources from one another; obtaining, by a mask generating section, separation reliability of a separated speech signal; separating, by the mask generating section, speech signal from noise; obtaining, by the mask generating section, distributions of speech signal and noise against separation reliability; generating, by the mask generating section, a soft mask for each frequency spectral component of the separated speech signal using the distributions of speech signal and noise against separation reliability; and recognizing, by a speech recognizing section, speeches separated by the sound source separating section using generated soft masks.

According to the present aspect, the mask generating section generates soft masks using distributions of speech signal and noise against separation reliability of the separated speech signal, and therefore appropriate soft masks can be generated according to changes in environment. As a result, a high-performance speech recognition system can be obtained.

In a speech recognition system and a speech recognizing method according to an embodiment of the present invention, the mask generating section separates speech signal from noise using a cumulative histogram weighted by moving average and generated for each frequency spectral component of time-series input signals, the horizontal and vertical axes of the cumulative histogram being index of power level and cumulative frequency respectively, and obtains the distributions of speech signal and noise against separation reliability.

According to the present embodiment, speech signal and noise can be clearly separated from each other based on properties of distributions of speech signal and noise against power.

In a speech recognition system and a speech recognizing method according to an embodiment of the present invention, the mask generating section is arranged to adaptively generate the soft masks according to a change in environment.

According to the present embodiment, the soft masks can be constantly adapted to a change in environment.

In a speech recognition system and a speech recognizing method according to an embodiment of the present invention, the mask generating section generates the soft masks using a probability density function of a Gaussian distribution, the separation reliability being a variable of the function.

According to the present embodiment, the soft masks can be generated in a simple procedure.

In a speech recognition system and a speech recognizing method according to an embodiment of the present invention, the soft masks are provided with separate weighting factors for static and dynamic features of the speech signals.

According to the present embodiment, performance of speech recognition can be further improved by separately adjusting the weighting factors for static and those for dynamic features.

DETAILED DESCRIPTION OF THE INVENTION

Figure 1:
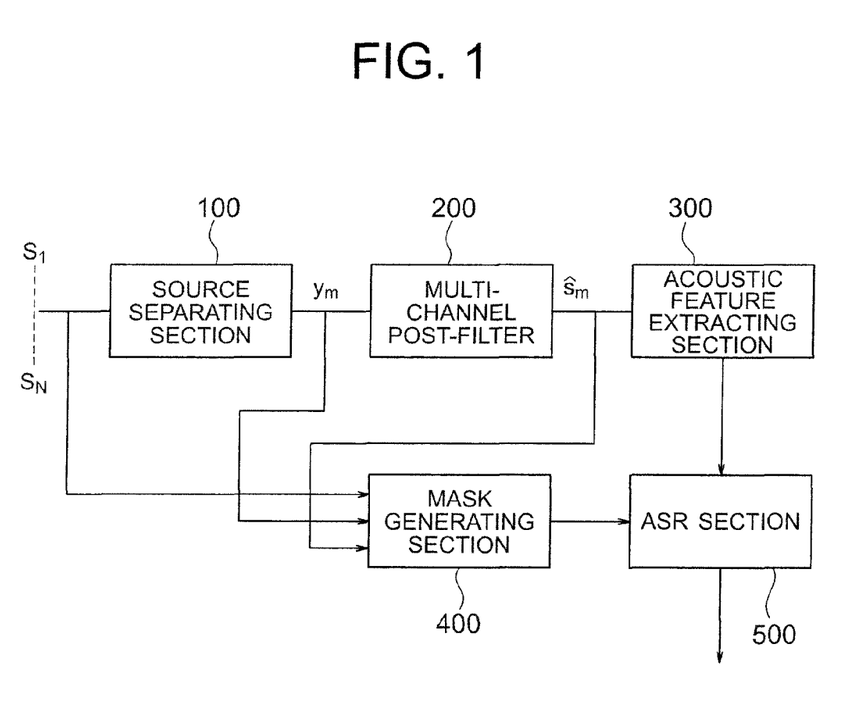
FIG. 1 illustrates a configuration of a speech recognition system according to an embodiment of the present invention.

FIG. 1 illustrates a configuration of a speech recognition system according to an embodiment of the present invention. The speech recognition system performs simultaneous recognition of speeches from multiple sound sources such as multiple speakers. The speech recognition system includes a source separating section 100, a multi-channel post-filter 200, an acoustic feature extracting section 300, a mask generating section 400 and a speech recognizing section 500.

The sound source separating section 100 will be described below. Suppose that there are M sources and N(≥M) microphones. A spectrum vector of M sources at frequency ω,s(ω), is denoted as $$[s1(\omega)s2(\omega)\ldots sM(\omega)]^T,$$

and a spectrum vector of signals captured by the N microphones at frequency ω,x(ω), is denoted as $$[x1(\omega)x2(\omega)\ldots xN(\omega)]^T,$$

where T represents a transpose operator. x(ω) is, then, calculated as $$x(\omega)=H(\omega)s(\omega)$$

where H(ω) is a transfer function matrix. Each component $H_{nm}$ of the transfer function matrix represents the transfer function from the m-th source to the n-th microphone. The source separation is generally formulated as $$y(\omega)=W(\omega)x(\omega),$$

where W(ω) is called a separation matrix. The separation is defined as finding W(ω) which satisfies the condition that output signal y(ω) is the same as s(ω).

As an algorithm for sound source separation, Geometric Source Separation (GSS) (L. C. Parra and C. V. Alvino, "Geometric source separation: Mergin convolutive source separation with geometric beam forming," *IEEE Transactions on Speech and Audio Processing* vol. 10, no. 6, pp. 352-362, 2002.), which is a hybrid algorithm of Blind Source Separation (BSS) and beam forming.

The multi-channel post-filter 200 will be described below. The multi-channel post-filter 200 is used to enhance the output of the sound source separating section 100 (S. Yamamoto, K Nakadai, J.-M. Valin, J. Rouat, F. Michaud, K Komatani, T. Ogata, and H. G. Okuno, "Making a robot recognize three simultaneous sentences in real-time," in *Proceedings of IEEE/RSJ International Conference on Intelligent Robots and Systems (IROS 2005)*. IEEE, 2005, pp. 897-902.). The multi-channel post-filter 200 is a spectral filter using an optimal noise estimator described in the document (Y. Ephraim and D. Malah, "Speech enhancement using minimum mean-square error short-time spectral amplitude estimator," *IEEE Transactions on Acoustics Speech and Signal Processing*, vol. ASSP-32, no. 6, pp. 1109-1121, 1984.). This method is a kind of spectral subtraction (S. F. Boll, "A spectral subtraction algorithm for suppression of acoustic noise in speech," in *Proceedings of 1979 International Conference on Acoustics Speech, and Signal Processing (ICASSP-79)*. IEEE, 1979, pp. 200-203.), but it generates less musical noises and distortion, because it takes temporal and spectral continuities into account.

An input of the multi-channel post-filter 200 is the output of the source separating section 100;y. An output of the multi-channel post-filter 200 is ŝ, which is defined as ŝ=Gy, where G is a spectral gain. The estimation of G is based on minimum mean-square error estimation of spectral amplitude. To estimate G, noise variance is estimated. The noise variance estimation $\lambda_m$ is expressed as $$\lambda_m = \lambda_m^{stat} \cdot \lambda_m^{leak}$$

where $\lambda_m^{stat}$.

is the estimate of the stationary component of the noise for source m at frame t for frequency f, and $\lambda_m^{leak}$ is the estimate of source leakage.

The stationary noise $\lambda_m^{stat}$.

is estimated, using MCRA technique (I. Cohen and B. Berdugo, "Speech enhancement for non-stationary noise environments," *Signal Processing* vol. 81, no. 2, pp. 2403-2418, 2001.). To estimate $\lambda_m^{leak}$, it is assumed that the interference from other sources is reduced by factor η (typically −10 dB≤η≤−5 dB). The leakage estimate is thus expressed as $$\lambda_m^{leak} = \eta \sum_{i=0, i \ne m}^{M-1} Z_i$$

where Zi is the smoothed spectrum of the m-th source, $y_m$ and recursively defined (with α=0.7) (S. Yamamoto, K Nakadai, J.-M. Valin, J. Rouat, F. Michaud, K Komatani, T. Ogata, and H. G. Okuno, "Genetic algorithm-based improvement of robot hearing capabilities in separating and recognizing simultaneous speech signals," in *Proceedings of 19th International Conference on Industrial, Engineering, and Other Applications of Applied Intelligent Systems (IEA/AIE '06)*, vol. LNAI 4031. Springer-Verlag, 2006, pp. 207-217.):

$$Z_m(f,t)=\alpha Z_m(f,t-1)+(1-\alpha)y_m(f,t).$$

The acoustic feature extracting section 300 will be described below. As an acoustic feature, Mel-Scale Log Spectrum (MSLS) is used MSLS is obtained by applying inverse discrete cosine transformation to Mel-Frequency Cepstral Coefficients (MFCC) (R. Plomp, L. Pols, and J. van de Geer, "Dimensional analysis of vowel spectra," *Acoustical Society of America*, vol. 41, no. 3, pp. 707-712, 1967.). Then three normalization processes are applied to obtain noise-robust acoustic features; mean power normalization, spectrum peak emphasis and spectrum mean normalization. The details are described in the document (Y. Nishimura, T. Shinozaki K Iwano, and S. Furui, "Noise-robust speech recognition using multi-band spectral features," in *Proceedings of 148th Acoustical Society of America Meetings*, no. 1aSC7, 2004.).

Acoustic features include static acoustic features and dynamic acoustic features. Let static acoustic features be M(k), dynamic acoustic features are defined by $$\Delta M(k) = \frac{1}{\sum_{i=-2}^{2} i^2} \sum_{i=-2}^{2} i \cdot M(k+i) \qquad (1)$$

where k and i are time indices. The dynamic spectral features are robust against leak noise and stationary background noise because the dynamic spectral feature defined as difference of contiguous static features can cancel leak noise and stationary background noise. The static spectral feature is less robust than dynamic spectral feature against such noises. Therefore, it is expected that recognition rate is improved when contribution of the dynamic spectral feature is higher than that of the static spectral feature.

The speech recognizing section 500 will be described below. The speech recognizing section 500 uses missing feature masks (which will be called MFMs hereinafter) in a temporal-frequency map to improve ASR (Automatic Speech Recognition). In MFMs, those which take binary values, 0 or 1, are called hard MFMs or hard masks while those which take continuous values between 0 and 1 are called soft MFMs or soft masks. Each MFM specifies whether a spectral value for a frequency bin at a specific time frame is reliable or not. Unreliable acoustic features caused by errors in preprocessing are masked using MFMs, and only reliable ones are used for a likelihood calculation in the ASR decoder. The decoder is an HMM (Hidden Markov Model)-based recognizer, which is commonly used in conventional ASR systems. In the speech recognizing section 500, the estimation process of output probability in the decoder is modified.

Let M(i) be a MFM vector that represents the reliability of the ith acoustic feature. The output probability bj(x) is given by the following equation:

$$b_j(x) = \sum_{l=1}^{L} P(l|S_j) \exp\left\{\sum_{i=1}^{N} M(i) \log f(x(i)|l, S_j)\right\} \quad (2)$$

where P(|) is a probability operator, and L represents the number of distributions of mixture of normal distributions while l represents an index of the number. x(i) is an acoustic feature vector, N is the size of the acoustic feature vector, and Sj is the jth state.

For implementation, Multiband Julian (Multiband Julius, "http://wwwfuruics.titech.acjp/mband julius/." is used, which is based on the Japanese real-time large vocabulary speech recognition engine Julian T. Kawahara and A Lee, "Free software toolkit for Japanese large vocabulary continuous speech recognition," in *International Conference on Spoken Language Processing (ICSLP)*, vol. 4, 2000, pp. 476-479. MFMs will be described in detail later.

The mask generating section 400 will be described below. The mask generating section 400 generates MFMs.

Figure 2:
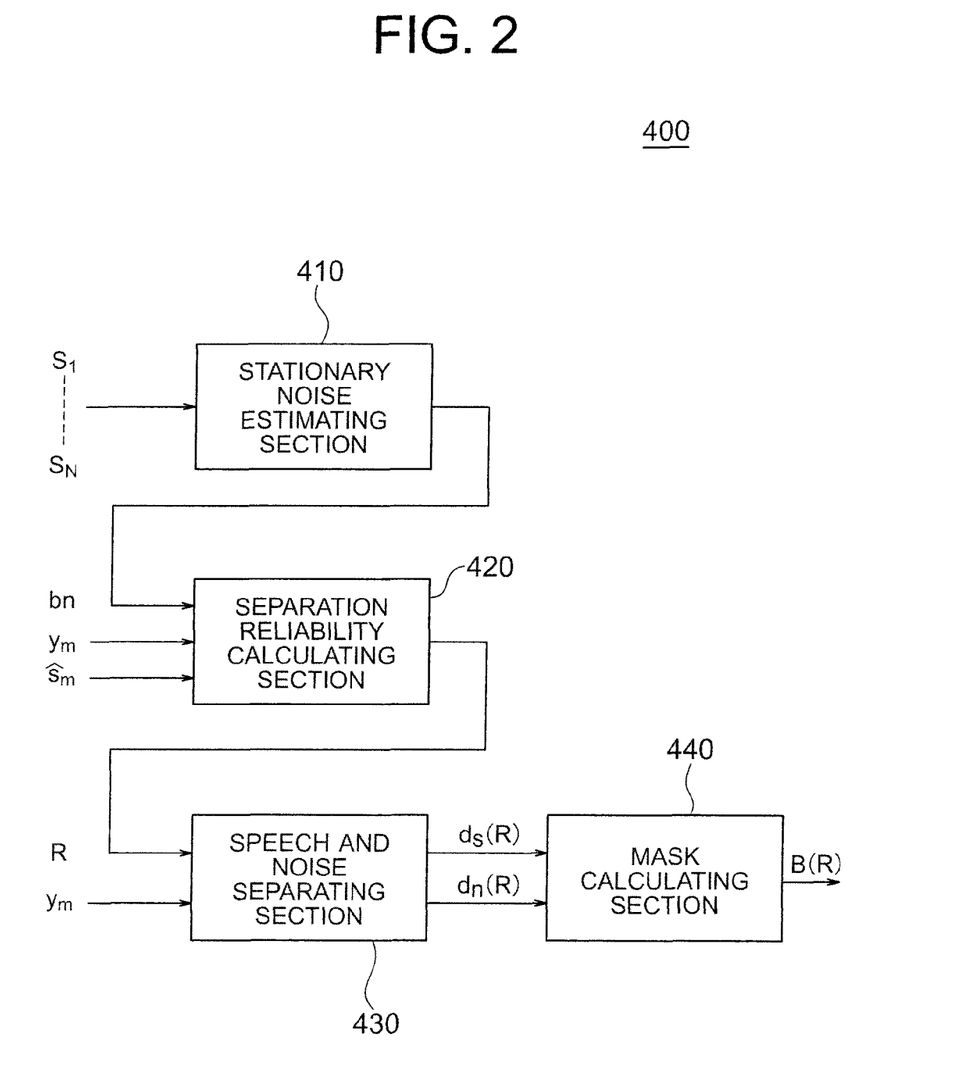
FIG. 2 illustrates a configuration of the mask generating section.

FIG. 2 illustrates a configuration of the mask generating section 400. The mask generating section 400 includes a stationary noise estimating section 410, a separation reliability calculating section 420, a speech and noise separating section 430, and a mask calculating section 440.

The stationary noise estimating section 410 estimates stationary noise from signals of N microphones, using MCRA technique I. Cohen and B. Berdugo, "Speech enhancement for non-stationary noise environments," *Signal Processing* vol. 81, no. 2, pp. 2403-2418, 2001.

The separation reliability calculating section 420 calculates a separation reliability R using the following expression.

$$R = \frac{\hat{s}_m + bn}{y_m} \quad (3)$$

$\hat{s}_m$ is the output of the multi-channel post filter 200 while $y_m$ is the output of source separating section 100.

$y_m$ is a sum of speech $\hat{s}_m$, background noise bn and leak. So, the reliability of separation becomes 1 when there exists no leak (when a speech is completely separated without blending of any other speeches) and approaches 0 as the leak becomes larger.

The speech and noise separating section 430 generates distributions of speech signal and noise against separation reliability R, using separation reliability R and output $y_m$ of the source separating section 100.

Figure 3:
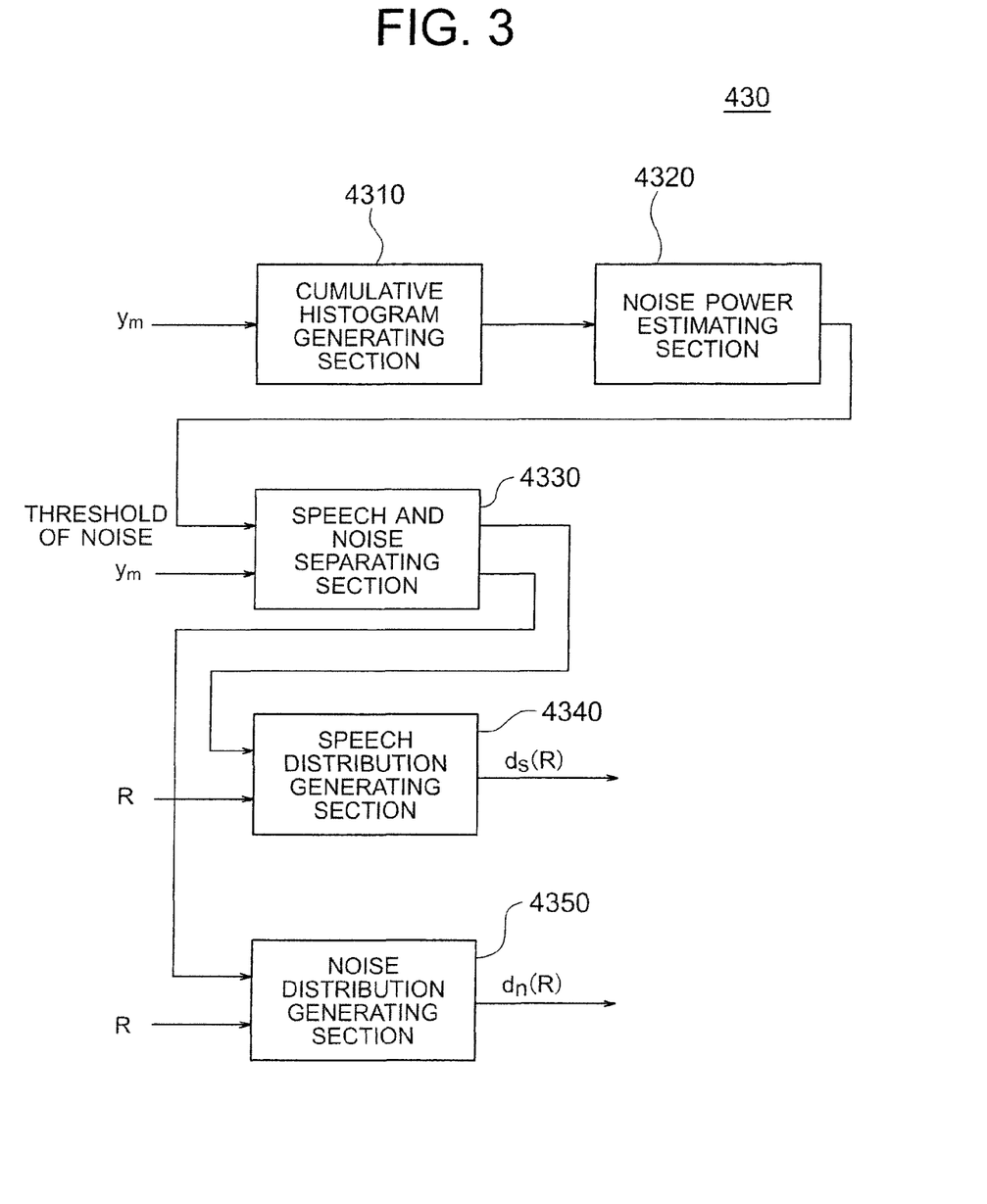
FIG. 3 illustrates a configuration of the speech and noise separating section of the mask generating section.

FIG. 3 illustrates a configuration of the speech and noise separating section 430 of the mask generating section 400. The speech and noise separating section 430 includes a cumulative histogram generating section 4310, a noise power estimating section 4320, a speech and noise separating section 4330, a speech distribution generating section 4340 and a noise distribution generating section 4350.

The cumulative histogram generating section 4310 generates a cumulative histogram weighted by moving average, whose horizontal axis indicates index of power level while whose vertical axis indicates cumulative frequency, for each frequency spectral component of the input signal in time series. The cumulative histogram weighted by moving average will be described later. The noise power estimating section 4320 obtains an estimate of noise power from the cumulative histogram for each frequency spectral component of the input signal.

Figure 5:
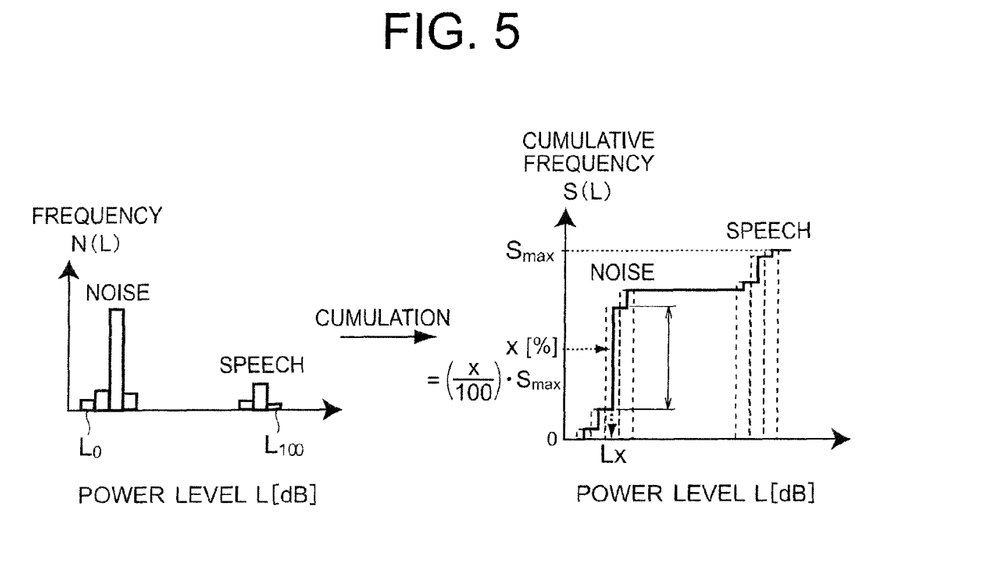
FIG. 5 illustrates a cumulative histogram generated by the cumulative histogram generating section.

FIG. 5 illustrates a cumulative histogram generated by the cumulative histogram generating section 4310. The graph on the left side of FIG. 5 shows a histogram. The horizontal axis indicates index of power level while the vertical axis indicates frequency. In the graph on the left side of FIG. 5, $L_0$ denotes the minimum level while $L_{100}$ denotes the maximum level. In general, power level of noise is less than that of speeches made by speakers. Further, occurrence frequency of noise is significantly greater than that of speeches made by speakers. The graph on the right side of FIG. 5 shows a cumulative histogram. In the graph on the right side of FIG. 5, $L_x$ indicates a position in the vertical axis direction of the cumulative histogram. For example, $L_{50}$ indicates the median which corresponds to 50 in the vertical axis direction. Since power level of noise is less than that of speeches made by speakers and occurrence frequency of noise is significantly greater than that of speeches made by speakers, a value of $L_x$ remains unchanged for x in a certain range as shown with a bidirectional arrow in the graph on the right side of FIG. 5. Accordingly, when the certain range of x is determined and $L_x$ is obtained, a power level of noise can be estimated.

Figure 6:
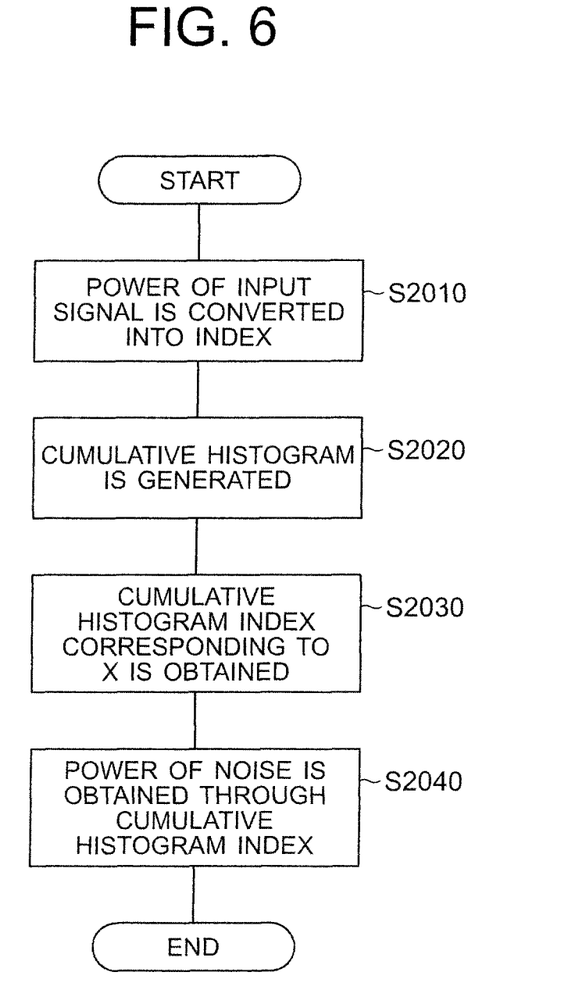
FIG. 6 is a flowchart for illustrating operations of the cumulative histogram generating section and the noise power estimating section.

FIG. 6 is a flowchart for illustrating operations of the cumulative histogram generating section 4310 and the noise power estimating section 4320. Symbols used in an explanation of the flowchart are given below.

t Current time step i Integer index y(t) Input signal that has complex values for processes in time frequency domain ⌊•⌋ Flooring function N(t,i) Frequency $S(t,i)$ Cumulative frequency
$L_{min}$ Minimum power level
$L_{step}$ Level width of 1 bin
$I_{max}$ Maximum index of cumulative histogram
$\delta$ Dirac delta function In step S2010 of FIG. 6, the cumulative histogram generating section 4310 converts power of the input signal into index using the following expressions.

$$Y_L(t)=20\log_{10}|y(t)| \quad (4)$$

$$I_y=\lfloor(Y_L(t)-L_{min})/L_{step}\rfloor \quad (5)$$

The conversion from power into index is performed using a conversion table to reduce calculation time.

In step S2020 of FIG. 6, the cumulative histogram generating section 4310 updates a cumulative histogram using the following expressions.

$$N(t,i) = \alpha N(t-1,i) + (1-\alpha)\delta(i-I_y(t)) \quad (6)$$

$$S(t,i) = \sum_{k=0}^{i} N(t,k) \quad (7)$$

$\alpha$ is the time decay parameter that is calculated from time constant Tr and sampling frequency Fs using the following expression.

$$\alpha = 1 - \frac{1}{(T_r F_s)}$$

The cumulative histogram thus generated is constructed in such a way that weights of earlier data become smaller. Such a cumulative histogram is called a cumulative histogram weighted by moving average. In expression (6), all indices are multiplied by $\alpha$ and $(1-\alpha)$ is added only to index $I_y(t)$. In actual calculation, calculation of Expression (7) is directly performed without calculation of Expression (6) to reduce calculation time. That is, in Expression (7), all indices are multiplied by $\alpha$ and $(1-\alpha)$ is added to indices from $I_y(t)$ to $I_{max}$. Further, in actuality, an exponentially incremented value $(1-\alpha)\alpha^{-t}$ is added to indices from $I_y(t)$ to $I_{max}$ instead of $(1-\alpha)$ and thus operation of multiplying all indices by $\alpha$ can be avoided to reduce calculation time. However, this process causes exponential increases of $S(t,i)$. Therefore, a magnitude normalization process of $S(t,i)$ is required when $S(t,I_{max})$ approaches the maximum limit value of the variable.

In step S2030 of FIG. 6, the noise power estimating section 4320 obtains an index corresponding to x using the following expression.

$$I_x(t) = \mathrm{argmin}\left[\left|S(t,I_{max})\frac{x}{100} - S(t,i)\right|\right] \quad (8)$$

In the expression, argmin means i which minimizes a value in the bracket [ ]. In place of search for all indices from 1 to $I_{max}$, search is performed in one direction from the index $I_x(t-1)$ found at the immediately preceding time so that calculation time is significantly reduced.

In step S2040 of FIG. 6, the noise power estimating section 4320 obtains an estimate of noise power using the following expression.

$$L_x(t)L_{min}+L_{step}\cdot I_x(t) \quad (9)$$

The method shown in FIG. 6 uses 5 parameters. Minimum power level $L_{min}$, level width of 1 bin $L_{step}$ and maximum index of cumulative histogram $I_{max}$ determine the range and sharpness of the histogram, they do not affect the estimated results, if proper values are set to cover the input level range with few errors. The typical values are below.

$$L_{min}=-100$$

$$L_{step}=0.2$$

$$I_{max}=1000$$

The maximum spectral level is assumed to be normalized to 96 dB (1 Pa).

x and $\alpha$ are primary parameters that influence the estimated level. However, parameter x is not so sensitive to the estimated Lx value, if the noise level is stable. For example, in FIG. 5, Lx indicates the same mode value even if parameter x changes by roughly 30-70%. Practically, since the speech signals are sparse in the time-frequency domain, the speech occurrence frequency is mostly less than 20% of the noise occurrence frequency and the value (20%) is independent of both SNR and (vibration) frequency. Therefore, this parameter can be set only according to the preferred noise level to be estimated and not to SNR or vibration frequency. For example, if the speech occurrence frequency is 20%, x=40 is set for the median noise level, and x=80 is set for the maximum.

Also, time constant Tr does not need to be changed according to neither SNR nor to frequency. Time constant Tr controls the equivalent average time for histogram calculation. Time constant Tr should be set to allow sufficient time for both noise and speech periods. For typical interaction dialogs, such as question and answer dialogs, the typical value of Tr is 10 s because the period of most speech utterances is less than 10 s.

The speech and noise separating section 4330 separates output of the source separating section 100
$y_m$
into speech and noise using the noise threshold value determined by the noise power estimating section 4320.

The speech distribution generating section 4340 generates a distribution of speech
$d_s(R)$
against separation reliability R using separated noise and separation reliability R. The distribution of speech
$d_s(R)$
is assumed to be a Gaussian distribution. The distribution function of a Gaussian distribution is defined by the following expressions.

$$d(x) = \frac{1}{2}\left(1 + \mathrm{erf}\left(\frac{x-\mu}{\sigma\sqrt{2}}\right)\right) \quad (10)$$

$$\mathrm{erf}(x) = \frac{2}{\sqrt{\pi}}\int_0^x e^{-t^2}dt \quad (11)$$

Accordingly, the speech distribution generating section 4340 generates a distribution of speech
$d_s(R)$
by defining an average
$\mu_s$
and a standard deviation
$\sigma_s$.

The noise distribution generating section 4350 generates a distribution of noise $d_n(R)$ against separation reliability R using separated noise and separation reliability R. The distribution of noise $d_n(R)$ is assumed to be a Gaussian distribution. Accordingly, the noise distribution generating section 4350 generates a distribution of noise $d_n(R)$ by defining an average $\mu_n$ and a standard deviation $\sigma_n$.

The mask generating section 440 obtains reliability of speech $B(R)$ that is, MFM based on the distribution of speech $d_s(R)$ and the distribution of noise $d_n(R)$ using the following expression.

$$B(R) = \frac{d_s(R)}{d_s(R) + d_n(R)} = \frac{1 + \operatorname{erf}\left(\frac{R - \mu_s}{\sigma_s\sqrt{2}}\right)}{2 + \operatorname{erf}\left(\frac{R - \mu_s}{\sigma_s\sqrt{2}}\right) + \operatorname{erf}\left(\frac{R - \mu_n}{\sigma_n\sqrt{2}}\right)} \quad (12)$$

A MFM for static acoustic features can be obtained by the following expression.

$$SM_m(k) = w_1 B(R(k)) \quad (13)$$

Further, a MFM for dynamic acoustic features can be obtained by the following expression.

$$\Delta SM_m(k) = w_2 \prod_{i=k-2, i \neq k}^{k+2} B(R(i)) \quad (14)$$

k represents a frame index. w1 and w2 represent weighting factors for static features and dynamic features, respectively. This embodiment is featured by separate weighting factors for static features and dynamic features. The weighting factors are previously determined. A method for determining the weighting factors will be given later as an example.

Figure 4:
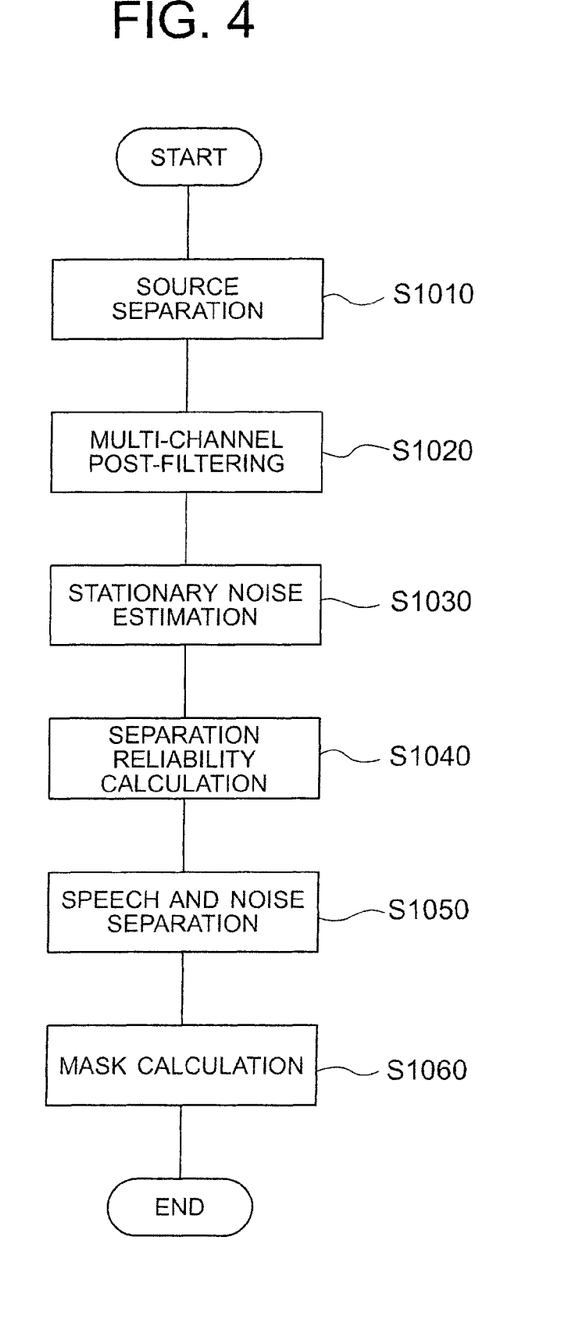
FIG. 4 is a flowchart for illustrating mask generating operations.

FIG. 4 is a flowchart for illustrating mask generating operations.

In step S1010 of FIG. 4, the source separating section 100 performs source separating operation. The output of the source separating section 100 is $y_m$.

Subscript m represents each sound source.

In step S1020 of FIG. 4, the multi-channel post-filter 200 enhances the output of the source separating section 100

$y_m$.

The output of the multi-channel post-filter 200 is $\hat{s}_m$.

In step S1030 of FIG. 4, the stationary noise estimating section 410 of the mask generating section 400 estimates stationary noise bn.

In step S1040 of FIG. 4, the separation reliability calculating section 420 calculates separation reliability R based on the stationary noise bn, the output of the source separating section 100

$y_m$ and the output of the multi-channel post-filter 200

$\hat{s}_m$.

In step S1050 of FIG. 4, the speech and noise separating section 430 of the mask generating section 400 obtains a distribution of speech against separation reliability R $d_s(R)$ and a distribution of noise against separation reliability R $d_n(R)$.

In step S1060 of FIG. 4, the mask calculating section 440 of the mask generating section 400 calculates reliability of speech $B(R)$ based on the distribution of speech against separation reliability R $d_s(R)$ and the distribution of noise against separation reliability R $d_n(R)$.

Operations in steps from S1010 to S1060 are repeated with the passage of time. Accordingly, when the environment changes as time goes by, MFMs can be adaptively generated.

Experiments for checking functions of weighting factors for static features and dynamic features $w_1$ and $w_2$ will be described below. For the sake of simplicity, reliability of speech $B(R)$ was approximately expressed by a sigmoid function with parameters a and b. A MFM for a static feature is expressed by the following.

$$SM_m(k) = w_1 Q(R(k) \mid a, b) \quad (15)$$

If $x > b$, $$Q(x \mid a, b) = \frac{1}{1 + \exp(-a(x - b))} \quad (16)$$

and otherwise $$Q(x|a,b) = 0 \quad (17)$$

where $0.0 \leq w_1$.

Further, a MFM for a dynamic feature is expressed by $$\Delta SM_m(k) = w_2 \prod_{i=k-2, i \neq k}^{k+2} Q(R(i) \mid a, b) \quad (18)$$

where $0.0 \leq w_2$

A robot with eight omnidirectional microphones is used to measure performance figures of recognition of three simultaneous speech signals to optimize parameters a, b, $w_1$ and $w_2$.

Simultaneous speech signals were recorded in a room with reverberation time of 0.35 seconds. Three different words were played simultaneously with the same loudness from three loudspeakers located 2 meters away from the robot. Each word was selected from the ATR (Advanced Telecommunications Research Institute International) phonetically balanced wordset consisting of 216 Japanese words.

Figure 7:
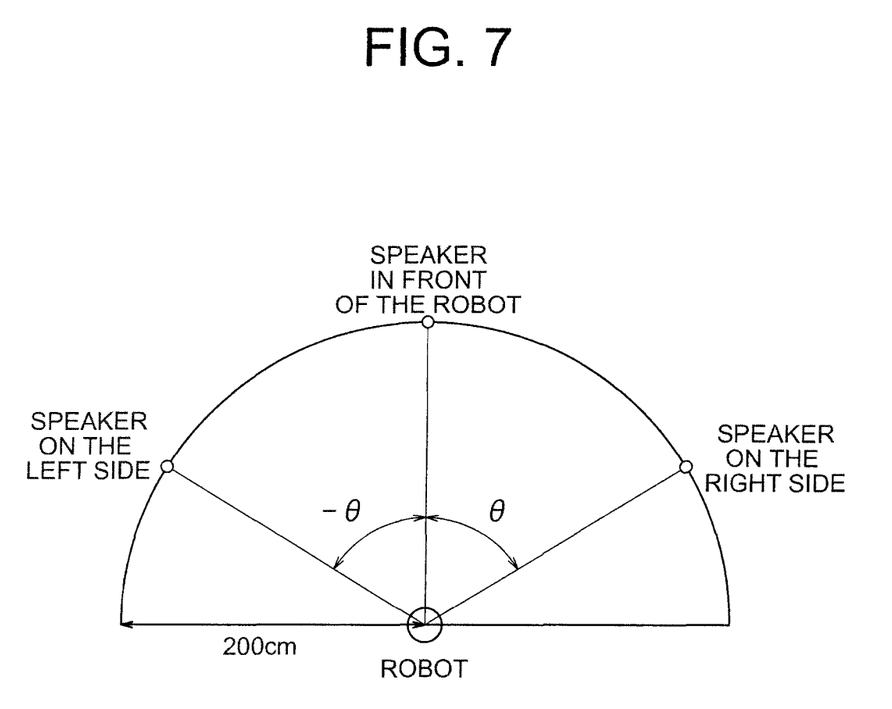
FIG. 7 shows an arrangement of the loudspeakers and the robot.

FIG. 7 shows an arrangement of the loudspeakers and the robot. One of the loudspeakers was fixed in front of the robot. The other two loudspeakers were set at 10, 20, 30, 40, 50, 60, 70, 80, or 90 degrees to the left and right of the robot. In FIG. 7 an angle to the right is represented by θ while an angle to the left is represented by −θ. In other words, the experiments were performed for 9 configurations with different angles θ. For each configuration, 200 combinations of the three different words were played.

Table 1 shows a search space for a parameter set $p=(a,b,w_1,w_2)$.

TABLE 1

| parameter | range | step |
|---|---|---|
| a | 40 | — |
| b | 0.1-1.5 | 0.1 |
| $w_1$ | 0.1-1.5 | 0.1 |
| $w_2$ | 0.1-1.5 | 0.1 |

Figure 8:
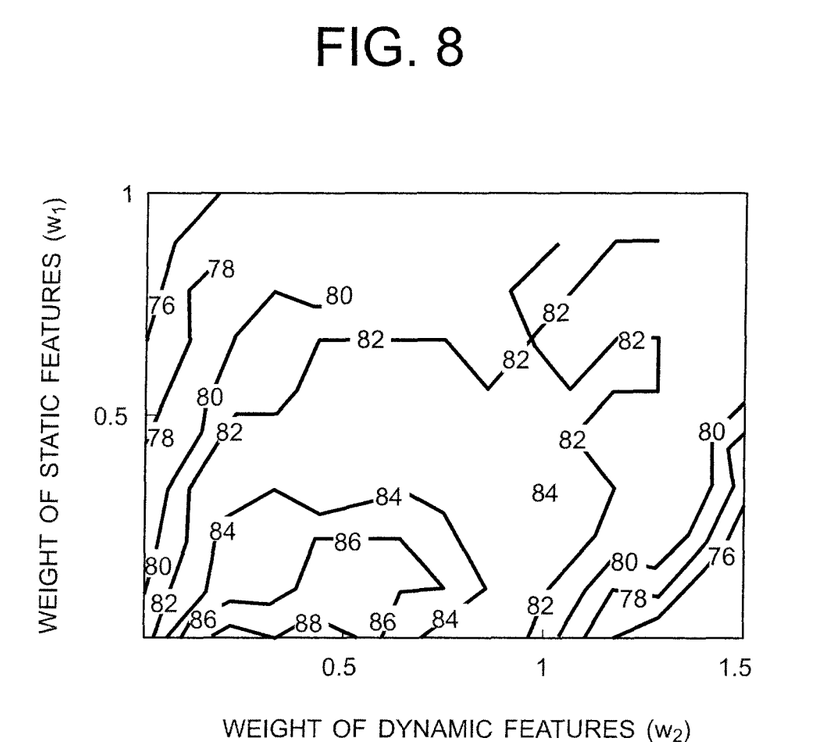
FIG. 8 shows an example of $w_1$ and $w_2$ parameter optimization for the front speaker when the loud speakers were located at 0, 90, and −90 degrees.

FIG. 8 shows an example of $w_1$ and $w_2$ parameter optimization for the front speaker when the loud speakers were located at 0, 90, and −90 degrees. For the other conditions, a similar tendency for $w_1$ and $w_2$ parameter optimization was obtained. Parameter optimization for a and b was performed and the result with a common tendency was obtained for every layout. Therefore, the optimized parameter set is defined by the following expression $$P_{opt} = \underset{p}{\operatorname{argmax}} \frac{1}{9} \sum_{\theta=10}^{90} \frac{1}{3}(WC_\theta(a,b,w_1,w_2) + WR_\theta(a,b,w_1,w_2) + WL_\theta(a,b,w_1,w_2))$$

where $WC_\theta$, $WR_\theta$ and $WL_\theta$ show word correct rates for the front, right and left loudspeakers where their locations are (0,θ,−θ) degrees, respectively. Finally, the optimal parameter set for the MFM was attained as $$p_{opt}=(40,0.5,0.1,0.2).$$

Another experiment was carried out to compare performance figures of the following three speech recognition systems.
1) Speech recognition system using hard MFM
  A hard MFM for a static feature is defined as below. If $R > T_{MFM}$, $HM_m(k)=1$ (19)

and otherwise $HM_m(k)=0$ (20)

$T_{MFM}$
represents a threshold value. A hard mask for a dynamic feature is defined as below.

$$\Delta HM_m(k) = \prod_{i=k-2, i \neq k}^{k+2} HM_m(i) \quad (21)$$

A variable k represents a frame index.

2) Speech recognition system using unweighted soft MFM
  MFMs of expressions (15) and (18) are used. Weighting factors are
  $w_1=w_2=1$.
3) Speech recognition system using soft MFM with optimized parameter set
  MFMs of expressions (15) and (18) are used. The parameter set is
  $p_{opt}=(40,0.5,0.1,0.2)$.

The experimental setup will be described below. Three loudspeakers were used to play three speeches simultaneously. A loudspeaker was fixed in front of the robot, and two other loudspeakers were located at
  ±30°,±60°,±90°,±120°, or ±150°
as shown in Table 2. The distance between the robot and each loudspeaker was 1 meter. Four combinations of sound sources were used as shown in Table 3. Thus, 20 test data sets were generated. Each test dataset consists of 200 combinations of three different words randomly-selected from ATR phonetically balanced 216 Japanese words.

TABLE 2

| Layout | front (deg.) | left (deg.) | right (deg.) |
|---|---|---|---|
| LL1 | 0 | 30 | −30 |
| LL2 | 0 | 60 | −60 |
| LL3 | 0 | 90 | −90 |
| LL4 | 0 | 120 | −120 |
| LL5 | 0 | 150 | −150 |

TABLE 3

| combination | front | left | right |
|---|---|---|---|
| SC1 | female 1 | female 2 | female 3 |
| SC2 | female 4 | female 5 | female 6 |
| SC3 | male 1 | male 2 | male 3 |
| SC4 | male 4 | male 5 | male 6 |

A 3-state and 16-mixture triphone model based on Hidden Markov Model (HMM) was trained using 27 dimensional MSLS features. To make evaluation fair, an open test was performed, that is, the acoustic model was trained with a different speech corpus from test data. For training data, Japanese News Article Speech Database containing 47,308 utterances by 300 speakers was used. After adding 20 dB of white noise to the speech data, the acoustic model was trained with the white-noise-added training data, which is a well-known technique to improve noise-robustness of an acoustic model for ASR.

Figure 9:
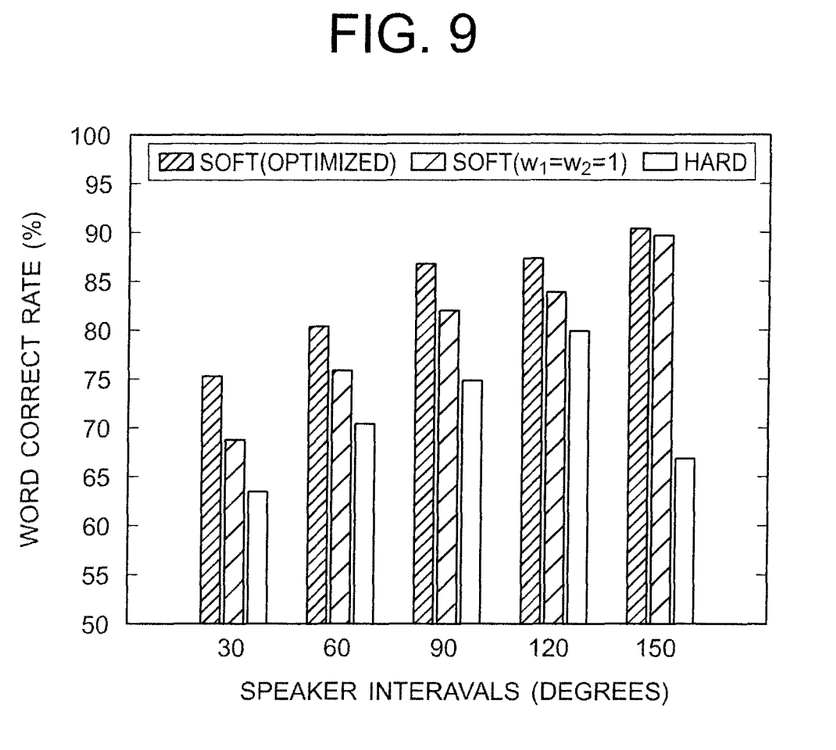
FIG. 9 illustrates averaged word correct rate for the front speaker.
Figure 10:
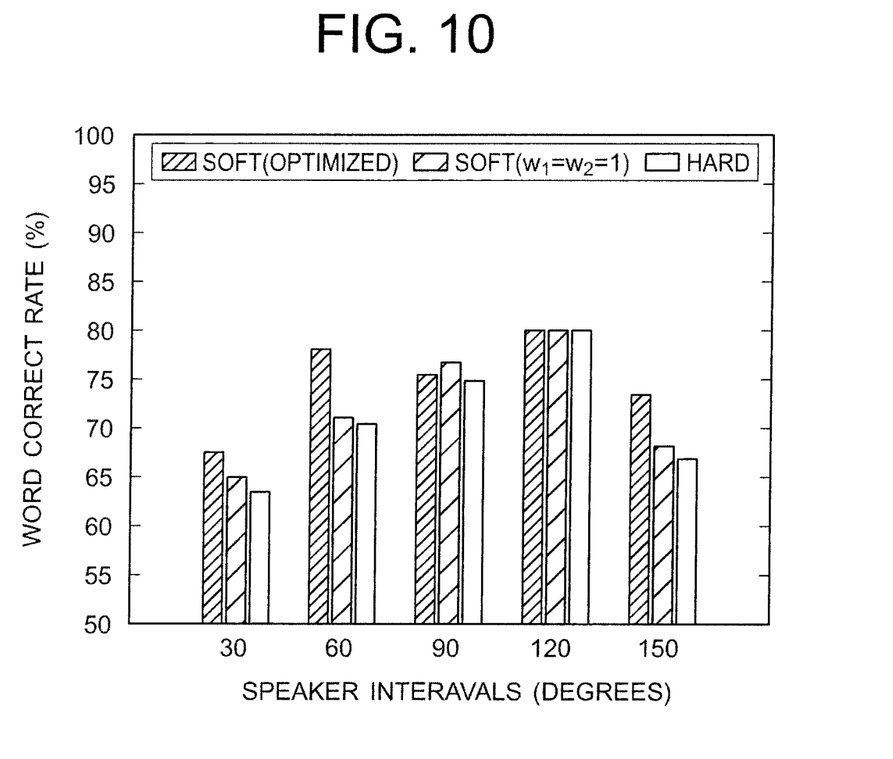
FIG. 10 illustrates averaged word correct rate for the left speaker.
Figure 11:
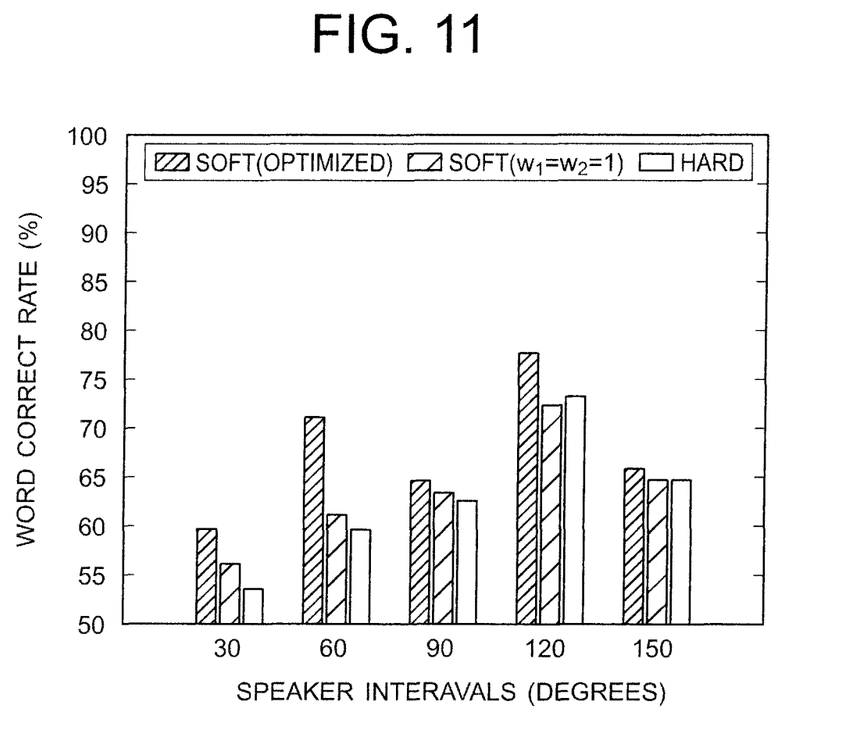
FIG. 11 illustrates averaged word correct rate for the right speaker.

FIGS. 9 to 11 illustrate averaged word correct rates for the front, left and right speakers, respectively.

For the front speaker, the soft MFM with the optimized parameters drastically improved ASR performance. For the left or right speaker, an improvement was less than that of the front speaker. However, improvements to some extent were found, especially when the angle between loudspeakers is narrow. The sound from the front speaker is affected both by the left and the right speakers, while the left or the right speaker is affected mainly by the front speaker. Thus, the number of overlapping TF (time-frequency) components for the front speaker is larger than that of the left or the right speaker. Also, their overlapping level for the front speaker is higher than the others. This proves that the MFM with the optimized parameters is able to cope with the large number of overlapping TF (time-frequency) components even in the highly-overlapped cases. The improvement of the MFM with the optimized parameters reached around 10 points by averaging three speaker cases.

When the difference between the unweighted MFM and the MFM with the optimized parameters is focused, the similar tendency to the difference between the soft and the hard MFMs can be found. That is, the optimization of weighting factors is more effective when two speakers are getting closer. This means that weighting factors work effectively to deal with highly overlapped TF (time-frequency) components.

What is claimed is:

1. A speech recognition system comprising:
    at least one processor which is configured to:
    separate mixed speeches from multiple sound sources from one another;
    generate soft masks for a static feature and a dynamic feature respectively of the speech signals, each soft mask taking continuous values between 0 and 1 for each frequency spectral component of a separated speech signal, wherein the processor generates the soft masks based on distributions of speech against separation reliability and distributions of noise against separation reliability; and
    recognize the separated speeches using the soft masks.

2. A speech recognition system according to claim 1, wherein the processor is further configured to separate speech signal from noise using a cumulative histogram weighted by moving average and generated for each frequency spectral component of time-series input signals, the horizontal and vertical axes of the cumulative histogram being index of power level and cumulative frequency respectively, and obtains the distributions of speech signal and noise against separation reliability.

3. A speech recognition system according to claim 1, wherein the processor is further configured to adaptively generate the soft masks according to a change in environment.

4. A speech recognition system according to claim 1, wherein the processor is further configured to generate the soft masks using a probability density function of a Gaussian distribution, the separation reliability being a variable of the function.

5. A speech recognition system according to claim 1, wherein the soft masks are provided with separate weighting factors for the static and dynamic features of the speech signals.

6. A speech recognizing method including the steps of:
    separating mixed speeches from multiple sound sources from one another;
    obtaining separation reliability of a separated speech signal;
    separating speech signal from noise;
    obtaining a distribution of speech signal and a distribution of noise against separation reliability;
    generating soft masks for a static feature and a dynamic feature respectively of the speech signals, each soft mask taking continuous values between 0 and 1 for each frequency spectral component of a separated speech signal, wherein the soft masks are generated based on the distribution of speech signal against separation reliability and the distribution of noise against separation reliability; and
    recognizing the separated speeches using the generated soft masks.

* * * * *